(12) United States Patent
Rouleau

(10) Patent No.: US 8,893,571 B2
(45) Date of Patent: Nov. 25, 2014

(54) TRANSMISSION SHIFT ASSEMBLY FOR A VEHICLE AND A METHOD OF MONITORING THE SAME

(75) Inventor: James E. Rouleau, Burt, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1693 days.

(21) Appl. No.: 11/893,955

(22) Filed: Aug. 17, 2007

(65) Prior Publication Data

US 2009/0048066 A1 Feb. 19, 2009

(51) Int. Cl.
*F16H 59/68* (2006.01)
*F16H 61/32* (2006.01)
*F16C 1/10* (2006.01)
*F16H 61/28* (2006.01)
*F16H 61/12* (2010.01)

(52) U.S. Cl.
CPC ......... *F16J 61/32* (2013.01); *F16H 2061/2884* (2013.01); *F16H 2061/1208* (2013.01); *F16J 2061/326* (2013.01); *F16H 59/68* (2013.01)
USPC .... 74/335; 74/473.15; 74/473.14; 74/473.21; 74/500.5

(58) Field of Classification Search
USPC ............... 74/473.14, 473.15, 473.21–473.28, 74/473.3, 473.31, 500.5, 335
See application file for complete search history.

(56) References Cited

U.S. PATENT DOCUMENTS

| | | | |
|---|---|---|---|
| 4,488,455 A | 12/1984 | Shetler et al. | |
| 4,519,266 A | 5/1985 | Reinecke | |
| 4,817,471 A | 4/1989 | Tury | |
| 4,875,391 A | 10/1989 | Leising et al. | |
| 4,922,769 A * | 5/1990 | Tury | 74/335 |
| 4,987,792 A * | 1/1991 | Mueller et al. | 74/473.12 |
| 5,062,314 A * | 11/1991 | Maier et al. | 74/473.18 |
| RE34,064 E | 9/1992 | Tury et al. | |
| 5,325,083 A | 6/1994 | Nassar et al. | |
| 5,370,015 A | 12/1994 | Moscatelli | |
| 5,420,565 A | 5/1995 | Holbrook | |
| 5,528,953 A | 6/1996 | Steinle et al. | |
| 6,253,138 B1 * | 6/2001 | Shober et al. | 74/335 |
| 6,316,936 B1 | 11/2001 | Striker et al. | |
| 6,487,484 B1 * | 11/2002 | Shober et al. | 74/335 |
| 6,536,297 B2 | 3/2003 | Yamamoto | |
| 6,561,050 B2 | 5/2003 | Yamamoto | |
| 6,564,662 B2 | 5/2003 | Yamamoto et al. | |
| 6,739,211 B2 * | 5/2004 | Yamamoto et al. | 74/335 |

(Continued)

OTHER PUBLICATIONS

"Feds Investigate Runaway BMWs," Manufacturing.Net website, 3 webpages (Aug. 9, 2011).

*Primary Examiner* — Daniel Yabut
(74) *Attorney, Agent, or Firm* — Cantor Colburn LLP

(57) ABSTRACT

A transmission shift assembly for a vehicle and a method of monitoring the same includes a transmission having a shift position member movable between a plurality of gear positions. A linkage is coupled to an actuator and movable between a plurality of positions in response to movement of the actuator. A cable having first and second ends is coupled to the linkage and the shift position member respectively for transferring movement from the actuator to the shift position member. A plurality of sensors are spaced from each other and disposed about the first end of the cable such that movement of the cable relative to said linkage causes the sensors to monitor movement of the shift position member between the gear positions for achieving a proper position of the shift position member in one of the gear positions.

11 Claims, 5 Drawing Sheets

(56) References Cited

U.S. PATENT DOCUMENTS

| | | | |
|---|---|---|---|
| 6,753,680 B2* | 6/2004 | Wolf | 324/207.2 |
| 7,137,499 B2 | 11/2006 | Riefe et al. | |
| 7,257,476 B2* | 8/2007 | Shimamura et al. | 74/473.1 |
| 2005/0160849 A1* | 7/2005 | Kozu et al. | 74/335 |
| 2006/0060019 A1* | 3/2006 | Sato et al. | 74/473.23 |
| 2006/0081085 A1* | 4/2006 | Otsuka et al. | 74/473.21 |
| 2006/0094565 A1* | 5/2006 | Sato et al. | 74/473.12 |
| 2007/0028709 A1* | 2/2007 | Futamura et al. | 74/335 |

* cited by examiner

TRANSMISSION SHIFT ASSEMBLY FOR A VEHICLE AND A METHOD OF MONITORING THE SAME

BACKGROUND OF THE INVENTION

1. Field of the Invention

The present invention relates to a transmission shift assembly for a vehicle and a method of monitoring the same.

2. Description of the Prior Art

Current column shift technologies use a steering column mounted device to move an automatic transmission through a plurality of gear positions. The gear positions may include a park position, a reverse position, a neutral position and a plurality of drive positions. The transmission includes a cam and a follower moving relative to each other. The cam includes a plurality of peaks spaced from each other with a valley disposed between each of the peaks to define the gear positions. A lever is coupled to the transmission for moving the cam in response to selection of one of the gear positions. A spool shaft is coupled to the lever and the cam such that movement of the lever causes movement to the cam. A transmission sensor senses a rotational displacement of the spool shaft to sense the gear position of the transmission. However the transmission sensor is unable to determine if the follower is disposed properly in one of the valleys of the desired gear positions. Improper position of the follower in the cam may cause damage to the transmission.

In addition, current technologies use an ignition lock mechanism to prevent removal of a key from an ignition until the transmission is put in the park position. However, the ignition lock mechanism requires additional components and manufacturing to a portion of the steering column.

Therefore there remains a need to develop a transmission shift assembly and a method of monitoring the same for a vehicle having a linkage with a plurality of sensors to sense whether one of a plurality of gear positions was proper achieved and to potentially eliminate the ignition lock mechanism.

SUMMARY OF THE INVENTION AND ADVANTAGES

The present invention provides for a transmission shift assembly for a vehicle having an actuator disposed in the vehicle. The assembly includes a transmission having a shift position member movable between a plurality of gear positions. A linkage is coupled to the actuator and movable between a plurality of positions in response to movement of the actuator. A cable having a first end is coupled to the linkage and a second end is coupled to the shift position member for transferring movement from the actuator to the shift position member. A plurality of sensors are spaced from each other and disposed about the first end of the cable such that movement of the cable relative to the linkage causes the sensors to monitor movement of the shift position member between the gear positions for achieving a proper position of the shift position member in one of the gear positions.

The subject invention also provides a method of monitoring a transmission shift assembly having an actuator coupled to a linkage defining an aperture with a shift position member movable between a plurality of gear positions. A cable having a first end is coupled to the aperture and a second end is coupled to the shift position member with a plurality of sensors disposed about the first end of the cable. The method includes the steps of actuating the actuator and moving the linkage between a plurality of positions in response to the actuation of the actuator. The method further includes the steps of moving the first end of the cable within the aperture of the linkage and moving the second end of the cable to move the shift position member to one of the gear positions in response to movement of the first end of the cable. The method further includes monitoring movement of the shift position member through the sensors of the cable as the shift position member moves between the gear positions to achieve a proper position of the shift position member in one of the gear positions.

The present invention therefore provides a transmission shift assembly having a plurality of sensors to monitor movement of a shift position member between a plurality of gear positions for achieving a proper position of the shift position member in one of the gear positions. The sensors communicate with a controller for monitoring movement of the shift position member and for repositioning the linkage and the shift position member if the sensors sense an improper gear position to prevent damage to a transmission. Additionally, the transmission shift assembly allows the transmission to automatically move the shift position member into a predetermined gear position upon movement of a switch to an off position without modifying the transmission and while eliminating an ignition lock mechanism.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
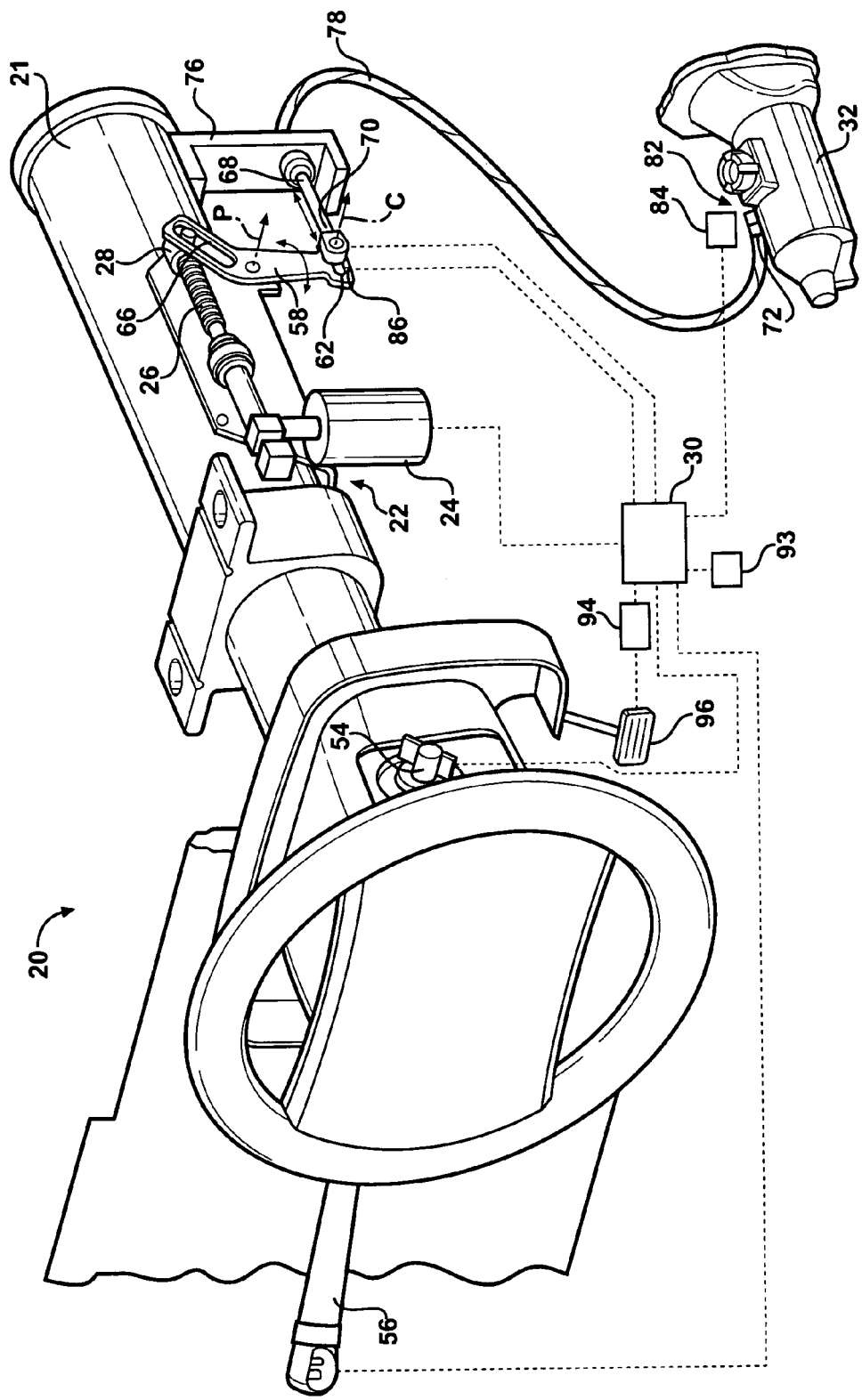
FIG. 1 is a perspective view of a transmission shift assembly having a linkage coupled to a nut and rotatable in response to translation of the nut.

Referring to the Figures, wherein like numerals indicate like or corresponding parts throughout the several views, a transmission shift assembly 20 for a vehicle (not shown) is generally shown in FIG. 1.

The transmission shift assembly 20 includes a steering column 21 and an actuator 22 disposed in the vehicle with the actuator 22 coupled to the steering column 21. The steering column 21 may be a tilting steering column, a telescoping steering column, or a tilting and telescoping steering column.

The actuator 22 includes a motor 24 for generating a moving force with a shaft 26 coupled to the motor 24 and rotatable in response to actuation of the motor 24. The motor 24 can rotate the shaft 26 in a first direction and a second direction with the first direction opposite to the second direction. A nut 28 is coupled to the shaft 26 and translates along the shaft 26 in response to the shaft 26 rotating in the first and second directions. A controller 30 communicates with the actuator 22 to signal to the motor 24 to rotate the shaft 26 and will be discussed further below.

Figure 2:
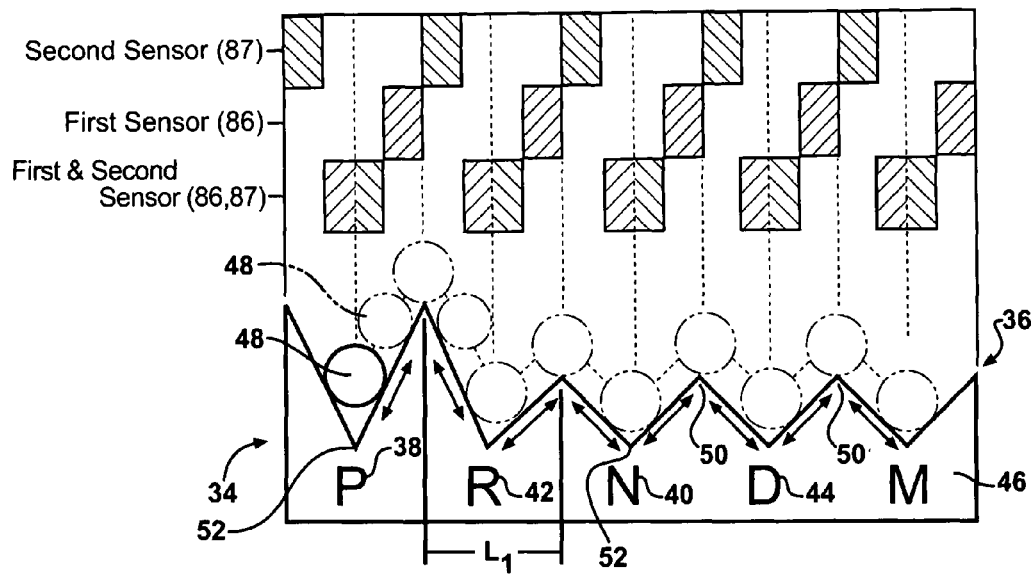
FIG. 2 is a schematic of a plate and a follower moving through a plurality of gear positions and the relative orientation of a plurality of sensors in relation to the plate and the follower.

Also referring to FIG. 2, the assembly 20 further includes a transmission 32 having a shift position member 34 movable between a plurality of gear positions 36. The transmission 32 is preferably an automatic transmission. The gear positions 36 include a park position 38, a neutral position 40, a reverse position 42 and a drive positions 44. However it is to be appreciated that more gear positions 36, less gear positions 36, and/or other gear positions 36 are possible, such as an overdrive position, a manual position, a first low position, a second low position, or any other acceptable gear position known to those skilled in the art.

The shift position member 34 is further defined as a plate 46 and a follower 48 with the plate 46 and the follower 48 movable relative to each other between the plurality of gear positions 36. The follower 48 is spring biased for allowing the follower 48 to move along the plate 46 as the plate 46 moves between the gear positions 36. The plate 46 is generally known as a rooster comb to those skilled in the art. The plate 46 includes a plurality of peaks 50 spaced from each other to define a length $L_1$ between each of the peaks 50. The plate 46 defines a plurality of valleys 52 with one of the valleys 52 disposed between each of the peaks 50 such that the peaks 50 and the valleys 52 of the plate 46 define the plurality of gear positions 36.

A selector member 56 is disposed adjacent the steering column 21 for allowing a user to select the desired gear position 36 for the transmission 32. The selector member 56 communicates with the controller 30 to signal the user's desired gear position 36 to the actuator 22 for moving the shift position member 34 to the requested gear position 36. The selector member 56 may be defined as a lever, a key pad, a plurality of buttons or any other acceptable member known to those skilled in the art to allow the user to select the gear positions 36.

Figure 3:
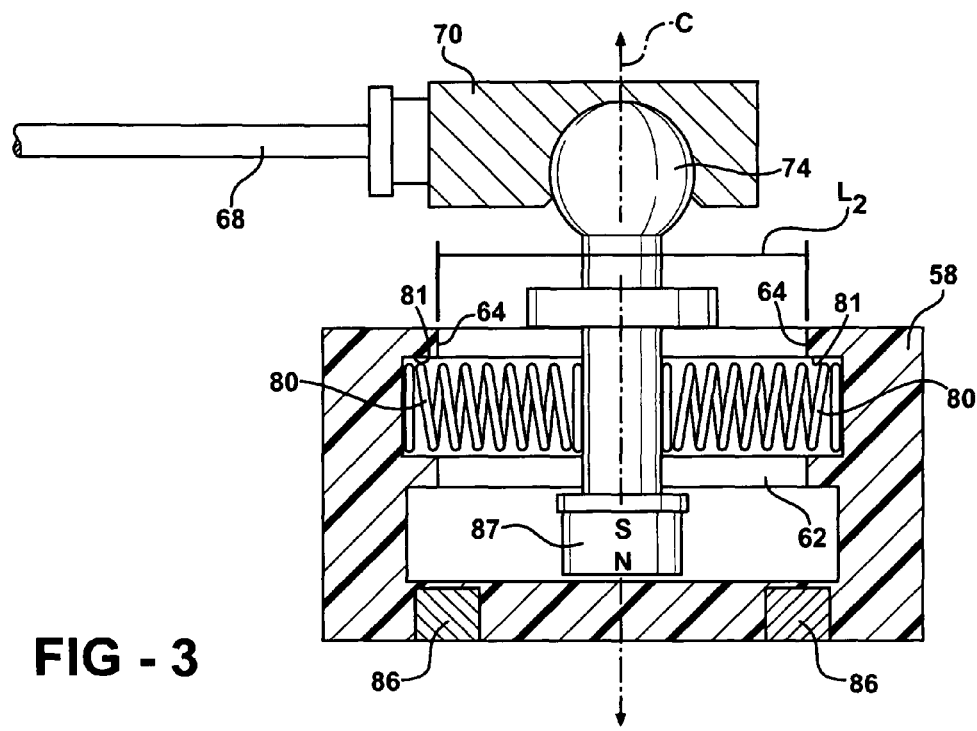
FIG. 3 is a partial cross-sectional view of a first end of a cable utilizing a plurality of biasing members.

Referring to FIG. 3, a linkage 58 is coupled to the actuator 22 and is movable between a plurality of positions in response to movement of the actuator 22. The motor 24 transmits the moving force from the shaft 26 and the nut 28 to the linkage 58 which causes the shift position member 34 to move to one of the gear positions 36. The linkage 58 defines at least one aperture 62 and defines opposing ends 64 of the aperture 62 with a center point C disposed between the ends 64 of the aperture 62. The aperture 62 of the linkage 58 defines a length $L_2$ between the ends 64 with the length $L_2$ of the aperture 62 shorter than the length $L_1$ of the peaks 50 for preventing movement of the shift position member 34 beyond the desired gear position 36 to an improper gear position 36.

Figure 4:
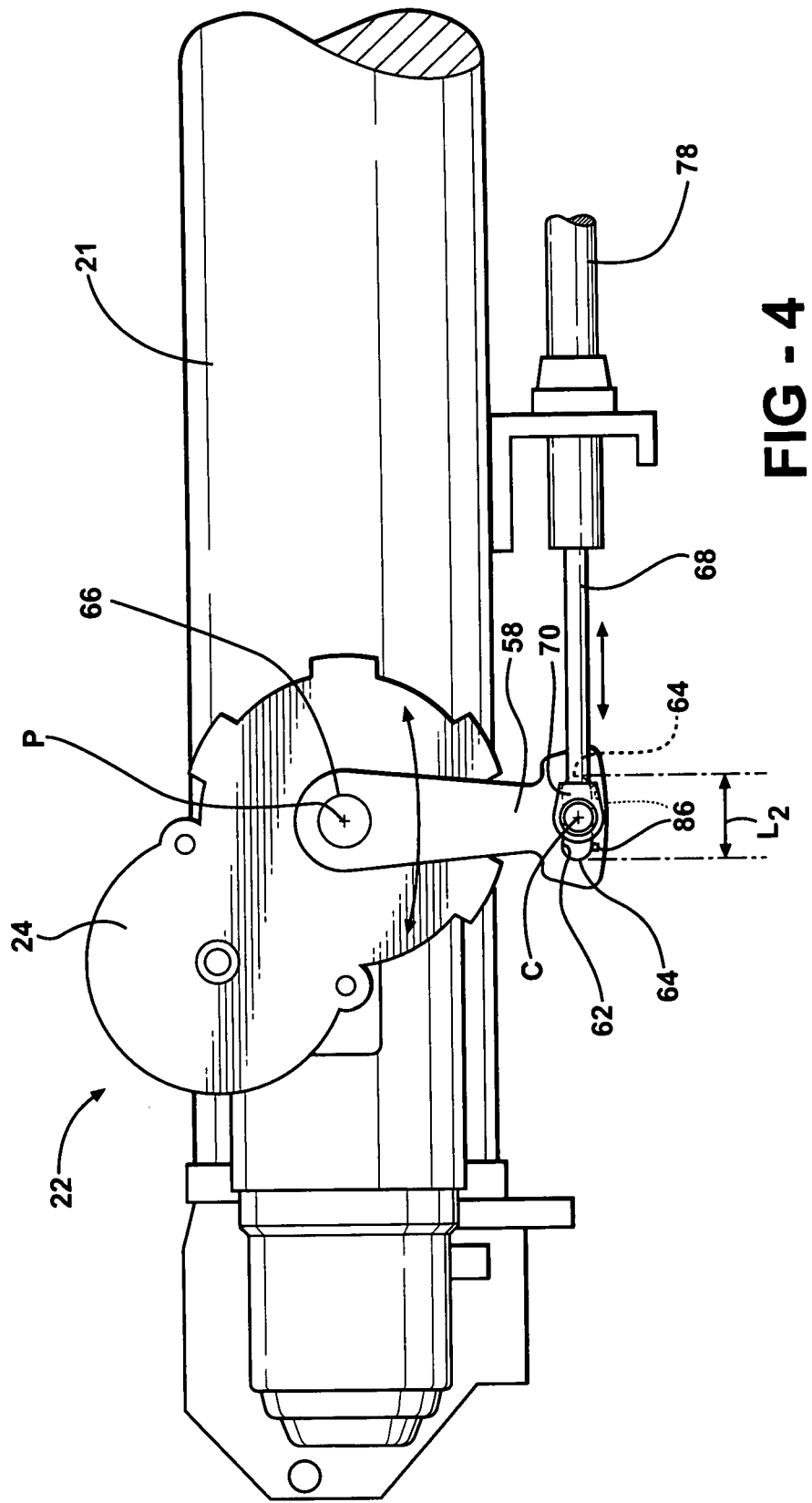
FIG. 4 is a side view of one of the configurations of the linkage with the linkage coupled directly to a motor.
Figure 5:
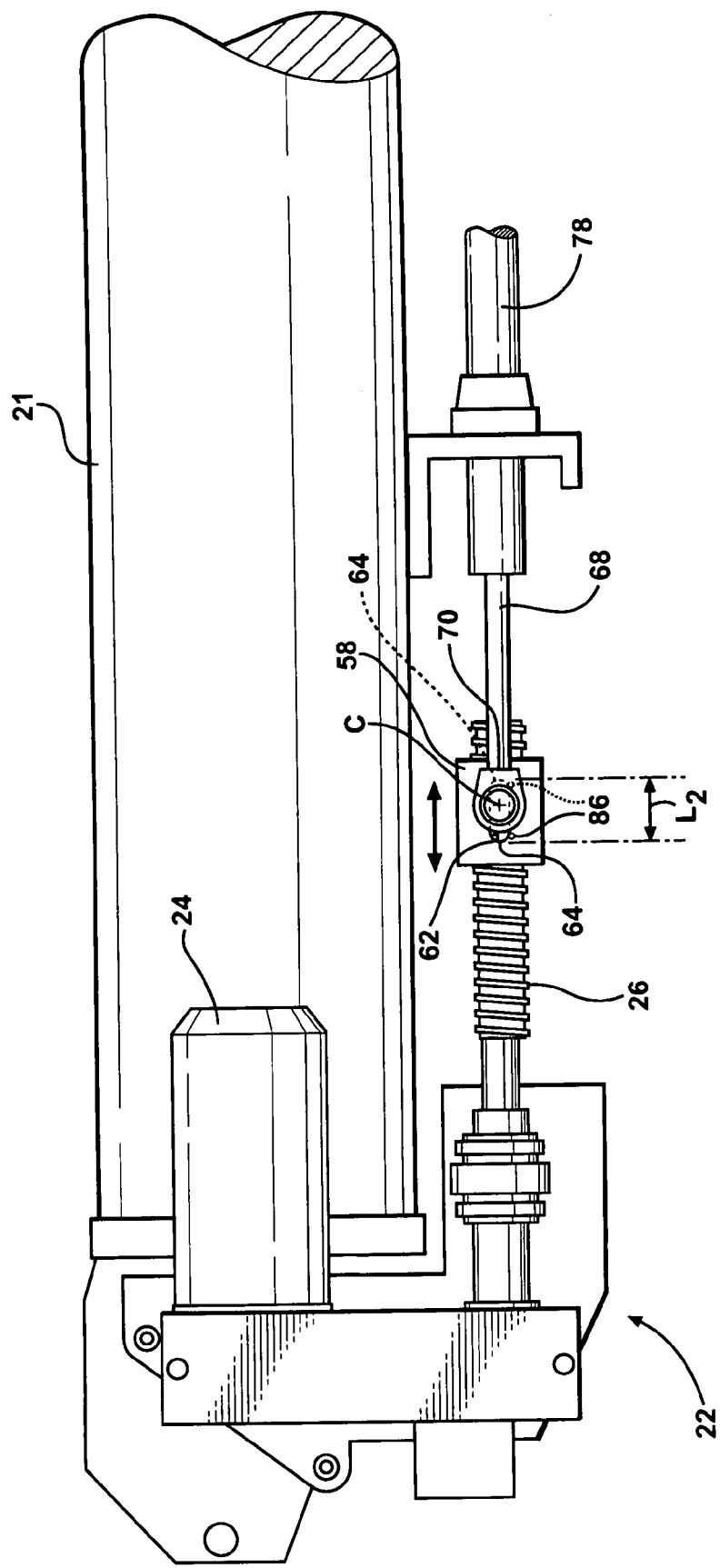
FIG. 5 is a side view of another one of the configurations of the linkage coupled to the nut and movable with the nut.

The linkage 58 may be disposed in many different configurations, as shown in FIGS. 1, 4, and 5. In the configuration as shown in FIG. 1, the at least one aperture 62 of the linkage 58 may be further defined as a first aperture 62 and a second aperture 66 spaced from each other. At least a portion of the nut 28 is movably disposed in the second aperture 66 for moving the linkage 58 between the positions in response to translation of the nut 28 along the shaft 26. The linkage 58 is rotatable about a pivot axis P with the pivot axis P disposed between the first and second aperture 66. However it is to be appreciated that the pivot axis P may be disposed anywhere on the linkage 58 as long as the linkage 58 moves between the positions.

In the configuration as shown in FIG. 4, the linkage 58 is directly mounted to the motor 24 and rotatable about the pivot axis P. The motor 24 is coupled to the second aperture 66 of the linkage 58 with the pivot axis P disposed through the second aperture 66. In the configuration as shown in FIG. 5, the second aperture 66 of the linkage 58 and the pivot axis P are eliminated. The linkage 58 is coupled to the nut 28 for moving the linkage 58 with the nut 28 in response to translation of the nut 28 along the shaft 26.

Referring back to FIG. 1, a cable 68 is disposed between the linkage 58 and the shift position member 34. More specifically, the cable 68 includes a first end 70 coupled to the linkage 58 and a second end 72 coupled to the shift position member 34 for transferring movement from the actuator 22 to the shift position member 34, even more specifically, the cable 68 is coupled to the aperture 62 of the linkage 58. Movement of the linkage 58 causes movement of the first and second ends 70, 72 of the cable 68 which moves the shift position member 34 to one of the gear positions 36. The first end 70 of the cable 68 is movable along the length $L_2$ of the aperture 62 of the linkage 58. The first end 70 of the cable 68 includes a stud 74 at least partially disposed in the aperture 62 of the linkage 58 and movable along the length $L_2$ of the aperture 62 in response to the linkage 58 moving to one of the positions. It is to be appreciated that the stud 74 may be any configuration.

A bracket 76 is disposed on the steering column 21 for supporting at least a portion of the cable 68. A conduit 78 is disposed about the cable 68 for protecting and supporting the cable 68. The conduit 78 may be spaced from the first and second ends 70, 72 of the cable 68 with the cable 68 slidably disposed in the conduit 78. More specifically, the bracket 76 supports the portion of the cable 68 proximal to the first end 70 such that when the linkage 58 moves in response to actuation of the actuator 22, the cable 68 slides within the conduit 78 which moves the shift position member 34 between the gear positions 36.

Referring to FIG. 3, a plurality of biasing members 80 may abut the first end 70 of the cable 68 for urging the first end 70 toward the center point C of the aperture 62. More specifically, the biasing members 80 may abut the stud 74 of the first end 70 of the cable 68 for urging the first end 70 of the cable 68 toward the center point C of the aperture 62. The biasing members 80 may be disposed in the aperture 62 of the linkage 58, spaced from the aperture 62 of the linkage 58 or disposed at any other acceptable location for urging the first end 70 of the cable 68 toward the center point C of the aperture 62. The linkage 58 may define a plurality of recesses 81 disposed adjacent the aperture 62 for receiving and supporting the biasing members 80. However, it is to be appreciated that the recesses 81 are optional. The biasing members 80 may be defined as a plurality springs or any other acceptable biasing members known to those skilled in the art for urging the first end 70 of the cable 68 toward the center point C of the aperture 62. However it is to be appreciated that the biasing members 80 are optional.

Referring back to FIG. 1, a position select lever 82 is coupled to the linkage 58 and the shift position member 34. More specifically, the position select lever 82 is coupled to the second end 72 of the cable 68 and the plate 46 for moving the plate 46 to one of the gear positions 36 in response to changes in the positions of the linkage 58. A spool shaft (not shown) is disposed between the position select lever 82 and the shift position member 34 for coupling the position select lever 82 to the shift position member 34 such that movement of the position select lever 82 causes movement of the shift position member 34. More specifically, the spool shaft couples the position select lever 82 to the plate 46 such that movement of the position select lever 82 causes movement of the plate 46. A transmission sensor 84 may be coupled to the transmission 32 for monitoring rotational displacement of the spool shaft. More specifically, the transmission sensor 84 communicates with the controller 30 for monitoring rotational displacement of the spool shaft to sense the gear position 36 of the transmission 32. However it is to be appreciated that the transmission sensor 84 may be eliminated.

Figure 6:
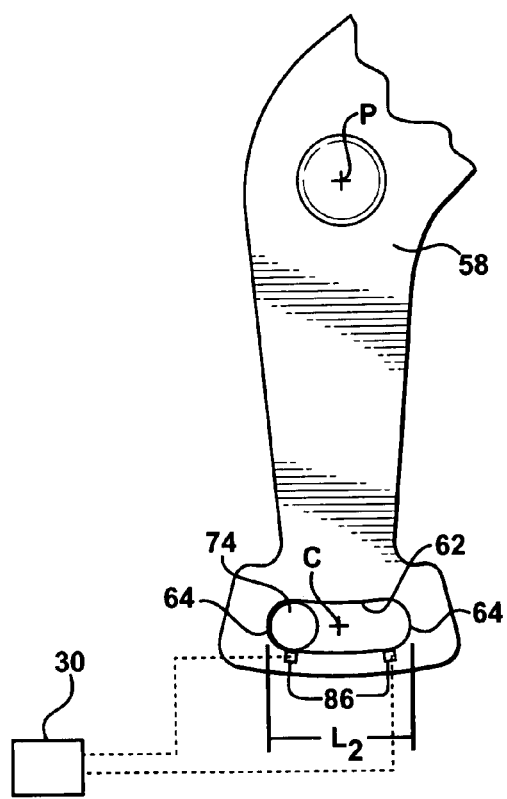
FIG. 6 is a front view of one of the sensors sensing a first position of the first end of the cable when the first end moves to one of the opposing ends of an aperture of the linkage.
Figure 7:
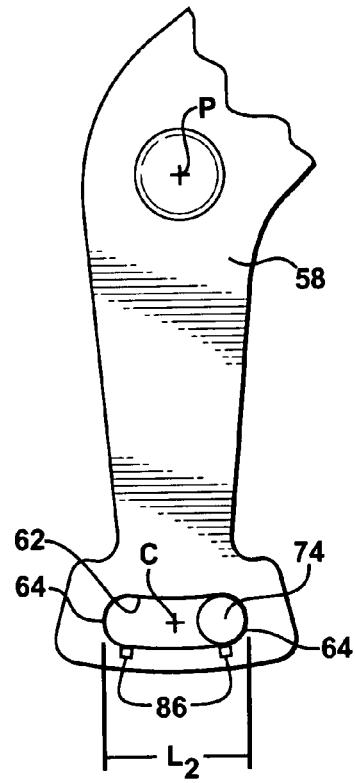
FIG. 7 is a front view of another one of the sensors sensing a second position of the first end of the cable when the first end moves to another one of the ends of the aperture of the linkage.
Figure 8:
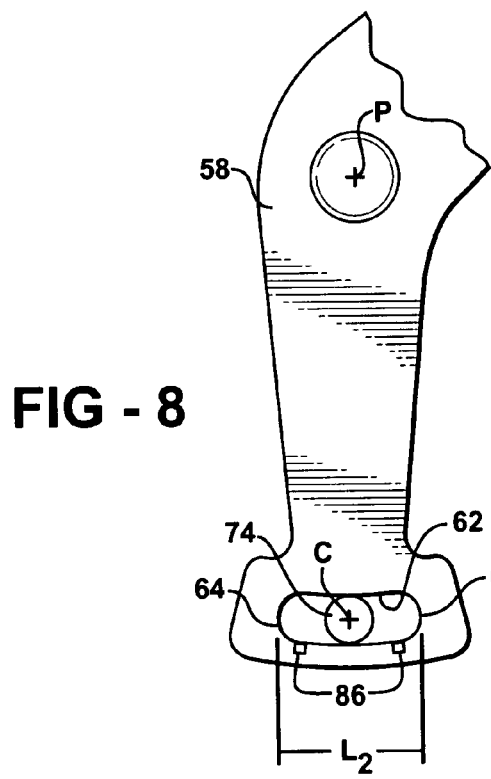
FIG. 8 is a front view of both of the sensors sensing a mid-position of the first end of the cable when the first end rests between the first and second positions of the aperture of the linkage.

Referring to FIGS. 6-8 the stud 74 of the first end 70 of the cable 68 is shown moving through the aperture 62 of the linkage 58. A plurality of sensors 86 are spaced from each other and disposed about the first end 70 of the cable 68 such that movement of the cable 68 relative to the linkage 58 causes the sensors 86 to monitor movement of the shift position member 34 between the gear positions 36 for achieving a proper position of the shift position member 34 in one of the gear positions 36, more specifically, movement of the cable 68 in the aperture 62 causes the sensors 86 to monitor movement of the shift position member 34. Preferably, the sensors 86 are spaced from the center point C of the aperture 62 of the linkage 58. The sensors 86 may be disposed in the aperture 62 of the linkage 58 (as shown in FIG. 6), may be spaced from the aperture 62 of the linkage 58 (as shown in FIG. 3) or may be disposed in any other acceptable location for monitoring movement of the shift position member 34.

The sensors 86 may be defined as a plurality of optical sensors, a strain gauge, a hall effect sensor, a plurality of physical switch sensors, a plurality of magnetic sensors 86 (as shown in FIG. 3) or any other sensor known to those skilled in the art. Referring to FIG. 3, when utilizing the magnetic sensors 86, the first end 70 of the stud 74 includes a magnet 87 that moves from one of the ends 74 of the aperture 64 to another one of the ends 74 of the aperture 64 when the shift position member 34 moves between the gear positions 36. The sensors 86 provide a way to accurately sense whether the shift position member 34 is disposed properly within one of the gear positions 36 for preventing damage to the transmission 32.

As shown in FIG. 6, one of the sensors 86 senses a first position of the first end 70 of the cable 68 when the first end 70 moves to one of the ends 64 of the aperture 62 of the linkage 58 as the shift position member 34 moves to one of the gear positions 36. As shown in FIG. 7, another one of the sensors 86 senses a second position of the first end 70 of the cable 68 when the first end 70 moves to another one of the ends 64 of the aperture 62 of the linkage 58 as the shift position member 34 continues to move to one of the gear positions 36. As shown in FIG. 8, both of the sensors 86 sense a mid-position of the first end 70 of the cable 68 when the first end 70 rests between the first and second positions at the center point C of the aperture 62 for sensing the shift position member 34 resting properly in one of the gear positions 36. When the sensors 86 sense the mid-position, the sensors 86 may be sensing the first end 70 in the mid-position between the first and second positions or the sensors 86 may be sensing the absence of the first end 70 disposed in the first and second positions. Hence, as used herein, the 'sense' or 'sensing' by the sensors 86 may be an indication of a location of an end of the cable 68 or may be an indication of an absence of an end of the cable 68. It is to be appreciated that the sensors 86 may be coupled to the linkage 58 and the first end 70 of the cable 68 without having the aperture 62 as long as the sensors 86 are able to sense the first position, the second position and the mid-position.

More specifically, one of the sensors 86 senses the first position of the first end 70 of the cable 68 when the first end 70 moves to one of the ends 64 of the aperture 62 of the linkage 58 as the follower 48 ascends up one of the peaks 50 of the plate 46. Another one of the sensors 86 senses the second position of the first end 70 of the cable 68 when the first end 70 moves to another one of the ends 64 of the aperture 62 of the linkage 58 as the follower 48 descends down one of the peaks 50 of the plate 46. Both of the sensors 86 sense the mid-position of the first end 70 of the cable 68 when the first end 70 rests between the first and second positions at the center point C of the aperture 62 and the follower 48 rests in one of the valleys 52 of the plate 46 for achieving the proper position of the shift position member 34 in one of the gear positions 36. If the sensors 86 sense the first end 70 of the cable 68 is in one of the first and second positions after the plate 46 and the follower 48 moved to another one of the gear positions 36, the sensors 86 signal to the controller 30 which causes the controller 30 to signal to the actuator 22 to adjust the current position of the linkage 58 to another position for achieving the proper gear position 36 to prevent damage to the transmission 32. In other words, if the follower 48 fails to be properly disposed in one of the valleys 52, the sensors 86 signal to the controller 30 and the controller 30 signals to the motor 24 to move the linkage 58, the position select lever 82, the plate 46 and the follower 48 for correctly positioning the follower 48 in the desired valley 52 to achieve the proper gear position 36 and to prevent damage to the transmission 32.

The sensors 86 sense whether the cable 68 is being pushed or pulled as the plate 46 and the follower 48 move relative to each other to achieve one of the desired gear positions 36. For illustrative purposes only, an example of the pushing and pulling of the cable 68 will be discussed below with the sensors 86 defined as a first sensor 86 and a second sensor 87. This discussion is applicable to changing between any of the gear positions 36. Referring to FIG. 2, a schematic of the plate 46 and the follower 48 moving through the plurality of gear positions 36 and the relative orientation of the first and second sensors 86, 87 in relation to the plate 46 and the follower 48 is shown. If the user desires to change one of the gear positions 36 of the transmission 32 from the park position 38 to the reverse position 42, the plate 46 and the follower 48 move relative to each other with the follower 48 ascending up one of the peaks 50 which causes the first sensor 86 to sense the cable 68 being pulled. After the follower 48 reaches a top of the peak 50, the follower 48 descends down the peak 50 and the second sensor 87 senses the cable 68 being pushed. Once the follower 48 is disposed properly in the valley 52 of the reverse position 42 then both of the first and second sensors 86, 87 sense the cable 68 fails to be pushed or pulled thus achieving the proper gear position 36.

As another example, if the user desires to change one of the gear positions 36 of the transmission 32 from the reverse position 42 to the park position 38 then the second sensor 87 would sense the cable 68 being pulled and the first sensor 86 would sense the cable 68 being pushed as shown in FIG. 2. In other words, the follower 48 and the plate 46 move back and forth through the gear positions 36 depending on the requested gear position 36 with the first and second sensors 86, 87 sensing either pushing or pulling depending on which way the requested gear position 36 is located. For example, the first sensor 86 senses the follower 48 ascending up the peak 50 when moving from the park position 38 to the reverse position 40 and the second sensor 87 senses the follower 48 ascending up the peak 50 when moving from the reverse position 40 back to the park position 38.

A switch 54 is movable between an on position and an off position for running the vehicle and turning off the vehicle. The switch 54 and the controller 30 communicate to automatically move the shift position member 34 into a predetermined gear position upon movement of the switch 54 to the off position. More specifically, due to the accuracy of the sensors 86 sensing the shift position member 34 resting properly in one of the gear positions 36, this allows the switch 54 when moved to the off position, to communicate to the controller 30 to put the transmission 32 automatically in the predetermined gear position. The predetermined gear position may be defined as the park position 38, the neutral position 40, the reverse position 42 and the drive position 44. However it is to be appreciated that the predetermined gear position may be defined as the overdrive position, the manual position, the first low position, the second low position, or any other acceptable gear position known to those skilled in the art. Preferably, the predetermined gear position is defined as the park position 38. By allowing the gear position 36 to automatically move to the park position 38 when the switch 54 is turned off, the assembly 20 may eliminate an ignition lock mechanism that prevent removal of a key from an ignition until the shift position member 34 is moved to the park position 38 without modifying the transmission 32. The switch 54 may be defined as a key rotatable in an ignition, a push button, or any other acceptable switch known to those skilled in the art.

The controller 30 communicates with the sensors 86 for monitoring the shift position member 34 in each of the gear positions 36 and for repositioning the linkage 58 and the shift position member 34 in response to one of the sensors 86 sensing the first end 70 of the cable 68 in at least one of the first and second positions and the shift position member 34 failing to be properly disposed in one of the gear positions 36. In other words, if the sensors 86 sense the first end 70 of the cable 68 is in one of the first and second positions after the shift position member 34 moves to another one of the gear positions 36, the sensors 86 signal to the controller 30 the improper position which causes the controller 30 to signal to the actuator 22 to adjust the current position of the linkage 58 to another position for achieving the proper gear position 36 to prevent damage to the transmission 32. In addition, utilizing the sensors 86 to sense movement of the shift position member 34 prevents relying on the accuracy of the actuator 22 moving the linkage 58 and the shift position member 34 to one of the gear positions 36. Additionally, utilizing the sensors 86 prevents relying on the accuracy of the transmission sensor 84 to sense the rotational displacement of the spool shaft. Also, when the sensors 86 sense the mid-position of the first end 70 of the cable 68, the proper gear position 36 is achieved and confirms that the transmission sensor 84 is sensing the proper gear position 36 for preventing any discrepancies between the sensors 86 and the transmission sensor 84.

As illustrated in FIG. 1, the controller 30 may communicate with the actuator 22, the switch 54, the selector member 56, the sensors 86, the transmission sensor 84, as well as other sensors 86 associated with the vehicle to enhance the safety operation of the vehicle. For example, a speed sensor 93 may communicate with the controller 30 that senses a velocity of the vehicle. The velocity is defined by a direction component and a speed component. The controller 30 can determine whether to change one of the gear positions 36 in response to, at least in part, either or both of the direction and speed components of the velocity of the vehicle. Therefore, if the controller 30 determines that the velocity of the vehicle is over a predetermined velocity when the gear position 36 is moved from one of the gear positions 36 to another one of the gear positions 36, the speed sensor 93 will communicate with the controller 30 to prevent changing the gear position 36. For example, if the vehicle is in the drive position 44 and traveling over the predetermined velocity and the user changes to the park position 38, the controller 30 will override the request and the transmission 32 will remain in the drive position 44. In addition, the controller 30 may communicate with a brake sensor 94 for sensing whether a brake pedal 96 is depressed. The controller 30 may require that the brake pedal 96 to be depressed before the transmission 32 may be changed from the park position 38 to any other one of the gear positions 36.

For illustration purposes only, a discussion of changing the gear positions 36 from the park position 38 to the reverse position 42 will be discussed below. This discussion is applicable to changing between any of the gear positions 36. The user moves the selector member 56 from the park position 38 to the reverse position 42. The selector member 56 communicates with the controller 30 the requested gear position 36. The controller 30 communicates with the actuator 22 to actuate the motor 24 and translate the nut 28 along the shaft 26. Movement of the nut 28 causes the linkage 58 to move to one of the positions corresponding to the requested gear position 36. The first end 70 of the cable 68 moves to one of the ends 64 of the aperture 62 of the linkage 58. More specifically, the stud 74 moves along the aperture 62 to one of the ends 64. One of the sensors 86 senses the first position of the first end 70 of the cable 68 when the first end 70 moves to one of the ends 64 of the aperture 62 of the linkage 58 as the follower 48 ascends up one of the peaks 50 toward the reverse position 42. Another one of the sensors 86 senses the second position of the first end 70 of the cable 68 when the first end 70 moves to another one of the ends 64 of the aperture 62 of the linkage 58 as the follower 48 descends down one of the peaks 50 toward the reverse position 42. Both of the sensors 86 sense the mid-position of the first end 70 of the cable 68 when the first end 70 rests between the first and second positions at the center point C of the aperture 62 with the follower 48 disposed properly in one of the valleys 52 of the plate 46 of the reverse position 42. The sensors 86 communicate the first position, the second position, and the mid-position to the controller 30 to sense when the follower 48 rests properly in one of the valleys 52 of the plate 46 of the reverse position 42. If the follower 48 rests in the improper gear position 36, the sensors 86 communicate to the controller 30 to reposition the linkage 58 and the shift position member 34 to obtain the proper position in the reverse position 42. When the follower 48 rests properly in the reverse position 42, the sensors 86 sense the first end 70 of the cable 68 in the mid-position and confirms the transmission sensor 84 is sensing the proper gear position 36 based on the rotational displacement of the spool shaft. If the user moves the switch 54 to the off position to put the transmission 32 back in the park position 38 and the vehicle is under the predetermined velocity of the speed sensor 93, the switch 54 and the controller 30 communicate to automatically move the shift position member 34 to the park position 38. More specifically, when the switch 54 moves to the off position, the controller 30 signals to the actuator 22 to actuate the motor 24 to translate the nut 28, which repositions the linkage 58 to move the cable 68, the position select lever 82, and the shift position member 34. When the sensors 86 sense the mid-position of the first end 70 of the cable 68, the park position 38 is properly achieved.

The subject invention also provides a method of monitoring the transmission shift assembly 20 having the actuator 22 coupled to the linkage 58. The assembly 20 further includes the shift position member 34 movable between the plurality of gear positions 36 and the linkage 58 defining the aperture 62. The assembly 20 further includes the cable 68 having the first end 70 coupled to the aperture 62 and the second end 72 coupled to the shift position member 34 with the plurality of sensors 86 disposed about the first end 70 of the cable 68. The method includes the steps of actuating the actuator 22 and moving the linkage 58 between the plurality of positions in response to the actuation of the actuator 22. The method further includes the steps of moving the first end 70 of the cable 68 within the aperture 62 of the linkage 58 and moving the second end 72 of the cable 68 to move the shift position member 34 to one of the gear positions 36 in response to movement of the first end 70 of the cable 68. Movement of the shift position member 34 is monitored through the sensors 86 of the cable 68 as the shift position member 34 moves between the gear positions 36 to achieve the proper position of the shift position member 34 in one of the gear positions 36. The sensors 86 and the controller 30 communicate between each other to monitor the proper position of the shift position member 34 in each of the gear positions 36. The switch 54 and the controller 30 communicated between each other to automatically move the shift position member 34 into the predetermined gear position upon movement of the switch 54 to the off position. The method further includes the steps of utilizing one of the sensors 86 to sense a first position of the first end 70 of the cable 68 when the first end 70 moves to one of the ends 64 of the aperture 62 of the linkage 58 as the shift position member 34 moves to one of the gear positions 36, utilizing another one of the sensors 86 to sense a second position of the first end 70 of the cable 68 when the first end 70 moves to another one of the ends 64 of the aperture 62 of the linkage 58 as the shift position member 34 continues to move to one of the gear positions 36, and utilizing both of the sensors 86 to sense a mid-position of the first end 70 of the cable 68 when the first end 70 rests between the first and second positions for sensing the shift position member 34 resting properly in one of the gear positions 36. The linkage 58 and the shift position member 34 are repositioned in response to one of the sensors 86 sensing the first end 70 of the cable 68 in at least one of the first and second positions and the shift position member 34 failing to be disposed in one of the gear positions 36.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A transmission shift assembly for a vehicle, said assembly comprising;
    an actuator disposed in the vehicle,
    a transmission having a shift position member movable along a path corresponding to a plurality of individual gear positions, each of said individual gear positions corresponding to a gear position portion of said path, each said gear position portion defining a gear position length and a valley at a center of said gear position portion toward which the shift position member is biased whenever said shift position member is within said gear position portion,
    a linkage coupled to said actuator and movable between a plurality of positions in response to movement of said actuator, said linkage defining at least one aperture,
    a cable having a first end coupled to said linkage and a second end coupled to said shift position member for transferring movement from said actuator to said shift position member, said first end of said cable being moveable relative to said linkage along an aperture path of said at least one aperture and having an aperture length that is less than said gear position length,
    a first position sensor and a second position sensor disposed about said first end of said cable such that movement of said cable relative to said linkage causes said first and said second sensor to monitor said movement of said shift position member within one of said individual gear positions for achieving a proper position of said linkage relative to said first end of said cable so that said first end of said cable is positioned near center portion when said shift position member is in said valley of one of said individual gear positions, and
    a controller communicating with said first and said second sensor for monitoring said first end of said cable when said shift position member is in said valley of each of said plurality of individual gear positions, wherein said first end of said cable is coupled to said at least one aperture such that movement of said cable in said aperture causes said first and said second sensor to monitor said movement of said shift position member within individual said gear positions for achieving a proper position of said shift position member in one of said individual gear positions, and said first and said second sensor are disposed in said aperture of said linkage.

2. An assembly as set forth in claim 1 wherein said center portion is disposed between opposing ends of said aperture and said first sensor spaced from said center portion and said second sensor spaced from said center portion and spaced from said first sensor.

3. An assembly as set forth in claim 2 wherein said first sensor senses a first position of said first end of said cable when said first end moves to one of said ends of said aperture of said linkage as said shift position member moves to one of said individual gear positions and said second sensor senses a second position of said first end of said cable when said first end moves to another one of said ends of said aperture of said linkage as said shift position member continues to move within said one of said individual gear positions.

4. An assembly as set forth in claim 3 wherein both of said first and second sensors sense a mid-position of said first end of said cable when said first end rests between said first and second positions at said center portion of said aperture for sensing said shift position member resting properly in one of said individual gear positions.

5. An assembly as set forth in claim 3 wherein said controller is configured to reposition said linkage and said shift position member in response to one of said first or second sensors sensing said first end of said cable in at least one of said first and second positions and said shift position member failing to be properly disposed in one of said individual gear positions.

6. An assembly as set forth in claim 4 wherein said shift position member is further defined as a plate and a follower with said plate and said follower movable relative to each other between said plurality of individual gear positions.

7. An assembly as set forth in claim 6 further including a position select lever coupled to said second end of said cable and said plate for moving said plate to one of said plurality of individual gear positions in response to changes in said positions of said linkage.

8. An assembly as set forth in claim 7 wherein said first sensor senses said first position of said first end of said cable when said first end moves to one of said ends of said aperture of said linkage as said follower ascends up one of said peaks of said plate and said second sensor senses said second position of said first end of said cable when said first end moves to another one of said ends of said aperture of said linkage as said follower descends down one of said peaks of said plate and both of said first and said second sensor sense said mid-position of said first end of said cable when said first end rests between said first and second positions at said center portion of said aperture and said follower rests in one of said valleys of said plate for achieving said proper position of said shift position member in one of said plurality of individual gear positions.

9. An assembly as set forth in claim 2 further including a plurality of biasing members abutting said first end of said cable for urging said first end toward said center portion of said aperture.

10. An assembly as set forth in claim 1 wherein said first and said second sensor are spaced from said aperture of said linkage.

11. A transmission shift assembly for a vehicle, said assembly comprising;
   an actuator disposed in the vehicle,
   a transmission having a shift position member movable along a path corresponding to a plurality of individual gear positions, each of said individual gear positions corresponding to a gear position portion of said path, each said gear position portion defining a gear position length and a valley at a center of said gear position portion toward which the shift position member is biased whenever said shift position member is within said gear position portion,
   a linkage coupled to said actuator and movable between a plurality of positions in response to movement of said actuator, said linkage defining an elongated aperture having a first end, a second end and a center portion, and defining an aperture length that is less than said gear position length,
   a cable having a first end coupled to said linkage and movable within said aperture and a second end coupled to said shift position member for transferring movement from said actuator to said shift position member,
   a first position sensor disposed at said first end of said aperture and a second position sensor disposed at said second end of said aperture, the first and second position sensors configured to sense a position of said first end of said cable within said aperture, and
   a controller communicating with said first and said second position sensors and configured to operate said actuator to adjust a position of said linkage relative to said first end of said cable so that said first end of said cable is positioned near center portion when said shift position member in said selected individual gear position after the shift position member is moved to the selected gear position in response to said first and second position sensors sensing the position of said first end of said cable away from said center portion of said aperture, and wherein said first and said second sensor are spaced from said aperture of said linkage.

* * * * *